United States Patent
Hill et al.

(10) Patent No.: US 9,479,519 B1
(45) Date of Patent: Oct. 25, 2016

(54) WEB CONTENT FINGERPRINT ANALYSIS TO DETECT WEB PAGE ISSUES

(71) Applicant: Amazon Technologies, Inc., Seattle, WA (US)

(72) Inventors: Peter Frank Hill, Seattle, WA (US); John W. Gray, III, Redmond, WA (US); Kurt Kufeld, Seattle, WA (US); Dennis Pilarinos, Vancouver (CA); Arun Sundaram, Seattle, WA (US); Peter Sven Vosshall, Bainbridge Island, WA (US); David John Ward, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/575,792

(22) Filed: Dec. 18, 2014

(51) Int. Cl.
| | |
|---|---|
| *G06F 11/00* | (2006.01) |
| *G08B 23/00* | (2006.01) |
| *H04L 29/06* | (2006.01) |
| *H04L 12/26* | (2006.01) |
| *G06F 11/30* | (2006.01) |
| *G06F 12/14* | (2006.01) |

(52) U.S. Cl.
CPC .............. *H04L 63/14* (2013.01); *H04L 43/04* (2013.01)

(58) Field of Classification Search
CPC ........... H04L 63/1416; H04L 63/1408; H04L 63/1441; H04L 63/1458; G06F 21/552
USPC ................ 713/153–154, 187–188, 193–194; 726/1, 13, 22–33; 709/206, 249, 389
See application file for complete search history.

(56) References Cited

U.S. PATENT DOCUMENTS

| | | | | |
|---|---|---|---|---|
| 2008/0289047 | A1* | 11/2008 | Benea ..................... | G06F 21/64 726/27 |
| 2014/0059163 | A1* | 2/2014 | Herbrich ........... | G06F 17/30348 709/217 |
| 2015/0332147 | A1* | 11/2015 | Anastas ................... | G06N 5/04 706/12 |

OTHER PUBLICATIONS

HTTP Archive, "About the HTTP Archive," <http://httparchive.org/about.php>, 7 pages (accessed Dec. 15, 2014).

* cited by examiner

*Primary Examiner* — Evans Desrosiers
(74) *Attorney, Agent, or Firm* — Klarquist Sparkman, LLP

(57) ABSTRACT

Techniques and solutions are described for detecting potential problems with web pages. For example, a web page can be analyzed (e.g., during loading of the web page) to determine statistics, such as size and structure statistics. The web page can be compared, using the statistics, to a statistical model representing the web page to determine if the web page is consistent with the statistical model. The statistical model can be created from previous page loads of the web page. Problems such as web page spoofing can be detected if the same web page content (e.g., content with a high degree of statistical similarity) is obtained from two different web sites. For example, a web page that is retrieved from one web site that matches a statistical model representing the same web page from another web site can indicate a spoofed web page.

20 Claims, 8 Drawing Sheets

WEB CONTENT FINGERPRINT ANALYSIS TO DETECT WEB PAGE ISSUES

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

We pages are displayed by the client computing device according to the web content and associated resources received for the web page. In some situations, web pages may not display as intended, which can be the result of a web server or network malfunction, a problem with web browser rendering, or another issue related to the retrieval or processing of the web pages. In some situations, an error may be generated or a user may notice the problem. However, in other situations, the problem may go unnoticed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

Figure 1:
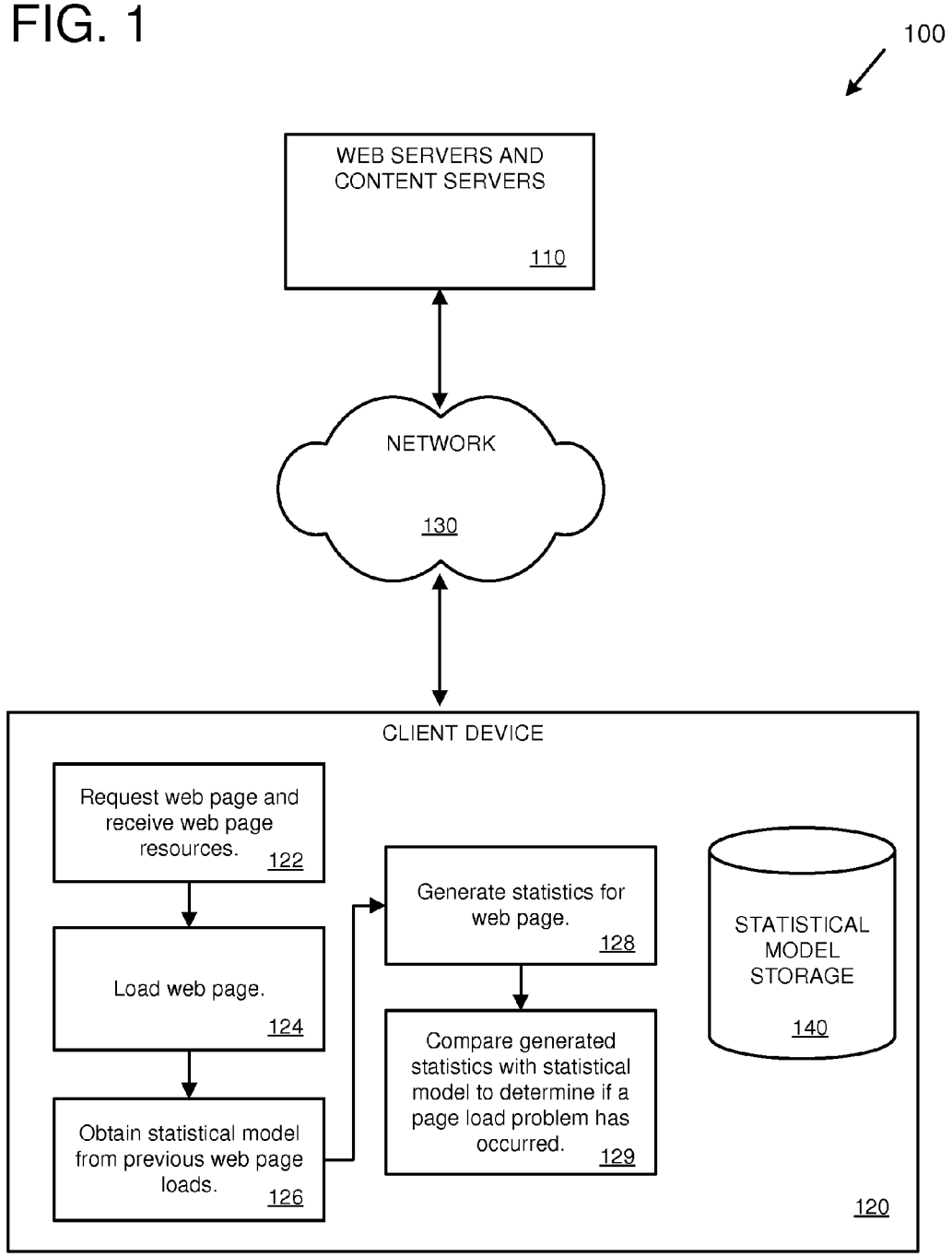
FIG. 1 is a block diagram depicting an example environment for detecting potential web page problems during web page loading.

The following description is directed to techniques and solutions for analyzing web page fingerprints (e.g., analyzing web page content during loading, which can include web page retrieval, rendering, and/or display) in order to detect potential problems or issues with the web pages. For example, in some situations a web page may be retrieved from a web server without any indication of an error (e.g., the Hypertext Transfer Protocol (HTTP) status code can be a successful 200-series code). However, even in such situations where the web server does not report an error, the web page may still have problems. For example, the content of the web page may be incomplete (e.g., when performing a Google™ search using www.google.com, the results page may contain just the web page header content with a blank or empty search results area). As another example, the web page may not render properly at the client web browser. For example, some portions of the web page content may not be displayed or may display incorrectly (e.g., with a corrupted or incomplete layout, with missing formatting, with content areas that are not visible, etc.).

Potential problems with web pages can be detected by analyzing the content of the web pages. For example, various aspects of the web page can be analyzed to generate statistics representing the web page content. The statistics representing a web page can be called a "fingerprint" of the web page (e.g., the statistics can uniquely identify the web page). Various machine learning techniques and statistical techniques can be applied to generate the statistics and/or compare the generated statistics to a current sample of the web page to determine whether a match is present.

In some implementations, web page statistics are generated from the size of various components of the web page. For example, statistics can be created from the number of bytes of HyperText Markup Language (HTML) of a web page, the number of bytes of JavaScript of a web page, the number of bytes of the images of the web page, the number of bytes of the CSS information for the web page, and/or the number of bytes of other components or resources of the web page (e.g., bytes of various structure components such as specific division elements). The number of bytes can be considered independently or aggregated (e.g., the bytes of HTML and JavaScript can be combined and considered as a whole). By generating statistics for the size of various components of a web page, a distinctive "fingerprint" (e.g., a fingerprint that is likely to be unique) of the web page can be created.

In some implementations, web page statistics are generated from various structural aspects of the web page. For example, statistics can be created from structural aspects obtained from HTML of the web page, from Document Object Model (DOM) elements of the web page, and/or from other aspects of the web page (e.g., from processed layers). For example, the division (div) elements of the web page (e.g., specific div elements that are considered significant, such as those representing content areas which could include header content areas, body content areas, navigation content areas, etc.) can be used to create a distinctive "fingerprint" of the web page (e.g., a fingerprint that is likely to uniquely identify the web page). In some implementations, statistics can be generated from a combination of size and structural aspects of a web page.

In order to identify potential problems with web pages, web page statistics that are generated from a currently retrieved or loaded web page can be compared with a statistical model representing the web page (e.g., representing a known good state of the web page). Whether a particular instance of a web page represents a known good state of the web page can be determined automatically (e.g., by automatically determining that that expected content and/or structure of the web page is present and has loaded as expected) and/or with user review (e.g., by having a user review the content and/or structure of the web page to determine whether the web page is correct). In some implementations, a statistical model is created from a number of previous page loads for the web page (e.g., a number of successful previous page loads that represent a known good state of the web page). The statistical model can include size statistics (e.g., number of bytes of HTML, number of bytes of JavaScript, etc.) and/or structure statistics (e.g., HTML element structure, div element structure, etc.). The statistical model can represent an average or typical version of the web page. For example, the size statistics from a number of previous web page loads can be averaged and a standard deviation can be calculated. A current page load can then be compared to the statistical model based on the average and the standard deviation.

In some implementations, a potentially spoofed web page can be detected by comparing a web page with statistical models. If the web page matches a statistical model that is associated with a different source for the web page, then a potentially spoofed web page can be identified. For example, a situation where the same web page (e.g., having the same, or almost the same, web content based on a comparison of the content of the web page with the statistical model) is obtained from two different web sources (e.g., different domain names and/or different IP addresses) can indicate that the web page is being spoofed.

FIG. 1 is a block diagram of an example environment 100 for detecting potential web page problems during web page loading. For example, potential problems can be detected when a web page is retrieved (e.g., from the HTML, JavaScript, images, and/or other received resources related to the web page) and/or when a web page is rendered (e.g., based on DOM information, processed layers, etc.).

The example environment 100 includes web servers and content servers 110 that provide web pages and associated resources to devices performing web browsing operations (e.g., to client device 120). For example, the web servers and content servers 110 can provide web resources such as HTML, JavaScript, images, video content, and/or other web content in response to a web page request from a client device (e.g., a client device running a web browser application).

The example environment 100 includes client device 120. For example, the client device 120 (e.g., a laptop, desktop, notebook, phone, tablet, or other type of computing device) can run a web browser application (not depicted) for loading web pages obtained, via the network 130 (e.g., the Internet), from the web servers and content servers 110.

The client device 120 can detect potential web page problems during web page loading. For example, the client device 120 can request a web page from the web servers and content servers 110, receive HTML and related web resources, generate statistics (e.g., size statistics and/or structure statistics) and compare the statistics to a statistical model of the web page to identify potential problems (e.g., by determining whether the statistics for the retrieved web page are consistent with the statistical model).

In some implementations, the client device 120 requests a web page from the web servers and content servers 110 and receives web page resources for the web page, as depicted at 122. For example, a user of the client device 120 can enter a URL for the web page into a web browser application running at the client device 120 to initiate the web page request. In response, the client device 120 can receive web page resources for the requested web page, which can comprise HTML, JavaScript, Cascading Style Sheet (CSS) information, images, and/or other web content.

Once the client device 120 has received the web page resources for the requested web page (as depicted at 122), the client device 120 loads the web page, as depicted at 124. For example, the client device can load the HTML and associated resources into a web browser application. The client device 120 can also perform various processing operations using the HTML and associated resources. For example, the client device 120 can create a DOM, create processed layers (e.g., composited layers), etc.

The client device 120 can obtain a statistical model that represents previous page loads of the web page (e.g., identified using a URL for the requested web page) from statistical model storage 140, as depicted at 126. The statistical model can represent a known good state of the web page. Instead of obtaining the statistical model from statistical model storage 140, the client device 120 can obtain the statistical model from an external source (e.g., from the web servers and content servers 110 or from another source). The statistical model can be obtained (as depicted at 126) at various points in time, such as when the web page is requested (e.g., before, during, or after the web page request operation depicted at 122), when the web is loaded (e.g., before, during, or after the web page load operation depicted at 124), or when the statistics are generated (e.g., before, during, or after the generate statistics operation depicted at 128).

The client device 120 generates statistics for the currently received web page, as depicted at 128. For example, the client device 120 can generate size statistics and/or structure statistics from the web page resources before they have been processed (e.g., by determining size information for HTML, JavaScript, images, etc.) and/or after they have been processed (e.g., by determining structure information from the DOM, such as the div structure of the web page).

The client device 120 compares the generated statistics for the currently received web page with the statistical model representing the web page in order to identify potential problems with the currently received web page, as depicted at 129. For example, the client device 120 can compare size statistics for the currently received web page (e.g., number of bytes of HTML, number of bytes of JavaScript, number of bytes contained within a particular element such as a body div element, etc.) against corresponding size statistics in the statistical model (e.g., average number of bytes of HTML from a number of previous successful page loads for the web page, average number of bytes of JavaScript from a number of previous successful page loads for the web page, average number of bytes contained within a particular element such as a body div element, etc.). A potential problem with the received web page can be identified if the statistics for the currently received web page are significantly different from the statistical model. For example, a potential problem can be identified if one or more of the size statistics are more than one standard deviation different from the statistical model. Other statistical comparison operations can be used to compare current web page statistics with a statistical model instead of, or in addition to, standard deviation. Other types of statistical models and parameters that can be applied in performing the comparison include a t-test statistical model, a rank-sum test (e.g., the Mann-Whitney U test), and a confidence interval parameter. In addition, standard statistical operations such as mean, median, average, and percentage can be used. The statistical model that is used for the comparison can depend on a number of factors, including the sample size used to create the statistical model (e.g., the number of web page loads of a particular web page that was used to create the statistical model for the web page) and whether the statistics (e.g., size and/or structure statistics) are normally distributed.

If the generated statistics do not match the statistical model, the client device 120 can output an indication of a potential problem with the currently received web page. For example, the client device 120 can save an indication of the potential problem to a log file, send a notification to a provider of the web page or web site, send a notification to a provider of web browser software, send the indication to a remote system (e.g., for remote logging), or notify the user of the client device 120.

As an example, consider a statistical model for a particular web page that includes size statistics of:
  HTML, average size=190 KB, standard deviation=28 KB
  JavaScript, average size=75 KB, standard deviation=8 KB
If a currently loaded instance of the web page includes size statistics of 182 KB of HTML and 73 KB of JavaScript, then size statistics of the currently loaded instance of the web page would be within one standard deviation of the statistical model. If one standard deviation is used as the range of a problem-free page load, then the currently loaded instance of the web page would not be identified as having a potential problem. However, if the currently loaded instance has an HTML size of 50 KB (well outside the one standard deviation range of 162 KB to 218 KB) then the currently loaded instance of the web page can be identified has having a potential problem (e.g., part of the web content of the currently loaded instance of the web page may be missing or may not have rendered properly).

In some implementations, the statistics are combined for comparison. For example, the HTML size and the JavaScript size in the example above can be combined to create a combined average size of 265 KB with a standard deviation of 36 KB. The combined sizes can then be compared to combined size statistics of a currently loaded instance of the web page.

As another example, consider a statistical model for a particular web page that includes div structure information for div elements with identifier "id" attributes (e.g., a div element such as "<div id='topnav' . . . >" which can indicate a particular web page content area). Specifically, consider the following example statistics:
  Div id elements, average number=74
The number of div id elements (e.g., the number of unique div elements) of a currently loaded instance of the particular web page can then be compared to the statistical model. Various criteria can be used to determine whether the number of div elements matches, or is consistent with, the statistical model. For example, a standard deviation comparison can be used (e.g., one standard deviation, two standard deviations, etc.). As another example, a percentage threshold can be used (e.g., if the number of div id elements is more than 15% different from the average number from the statistical model, then a potential problem can be identified). Using a 15% variation threshold, if the number of div id elements of the currently loaded instance of the particular page is less than 63, or more than 85, then a potential problem can be identified. Specific div elements can also be compared (e.g., in addition to, or instead of, the number of div elements). For example, a comparison can be made between div elements with specific attributes (e.g., using "id" attributes which can indicate specific div types, such as header div elements, body div elements, navigation div elements, etc.).

As another example, consider a statistical model for a particular web page that includes DOM tree structure information. Specifically, consider a statistical model that includes DOM tree elements collected from a number of previous page loads of the particular web page, which can include specific DOM elements, a count of various types of DOM elements, attributes of DOM elements, ordering of DOM elements in the tree structure, etc. A currently loaded instance of the particular web page can be compared to the statistical model by comparing the DOM structure of the currently loaded instance with the DOM information stored in the statistical model. For example, matches can be identified between specific DOM elements of the currently loaded instance of the web page and the statistical model, the number of DOM elements can be compared, etc. A problem can be detected if the DOM structure does not match (e.g., varies from the statistical model by more than a specific amount). For example, if a threshold number of the DOM elements match the statistical model (e.g., if 90% of the DOM elements of the currently loaded instance of the web page are present in the statistical model), then the currently loaded instance of the web page can be identified as matching the statistical model (e.g., being consistent with the statistical model), and otherwise a potential problem can be identified (e.g., if less than 90% of the DOM elements match).

In addition to considering DOM tree information and div information, other structural information can be used to build a statistical model of a web page. For example, HTML tags can be considered (e.g., which tags are present, the number of tags, etc.). As another example, viewport information can be considered (e.g., the dimensions of the viewport).

In some implementations, a statistical model for a web page stores statistical information for each of a number of different variations of the web page. For example, a particular web page may contain different content (e.g., different web elements, a different structure, etc.) depending on a number of factors. For example, the particular web page may contain different content depending on whether the user is authenticated (e.g., logged in to the web site). The particular web page may contain different content depending on user classification criteria (e.g., users can be classified into groups based on criteria such as geographical location, device capabilities, etc., and the web page may appear different to the different groups of users). The particular web page may also vary over time. The statistical model for a web page can store information for each of a number of different versions of the web page, and a comparison to a currently retrieved instance of the web page can be made with each of the number of different versions stored in the statistical model. A comparison of a currently retrieved instance of the web page can result in a match with one or more versions of the web page stored in the statistical model.

Figure 2:
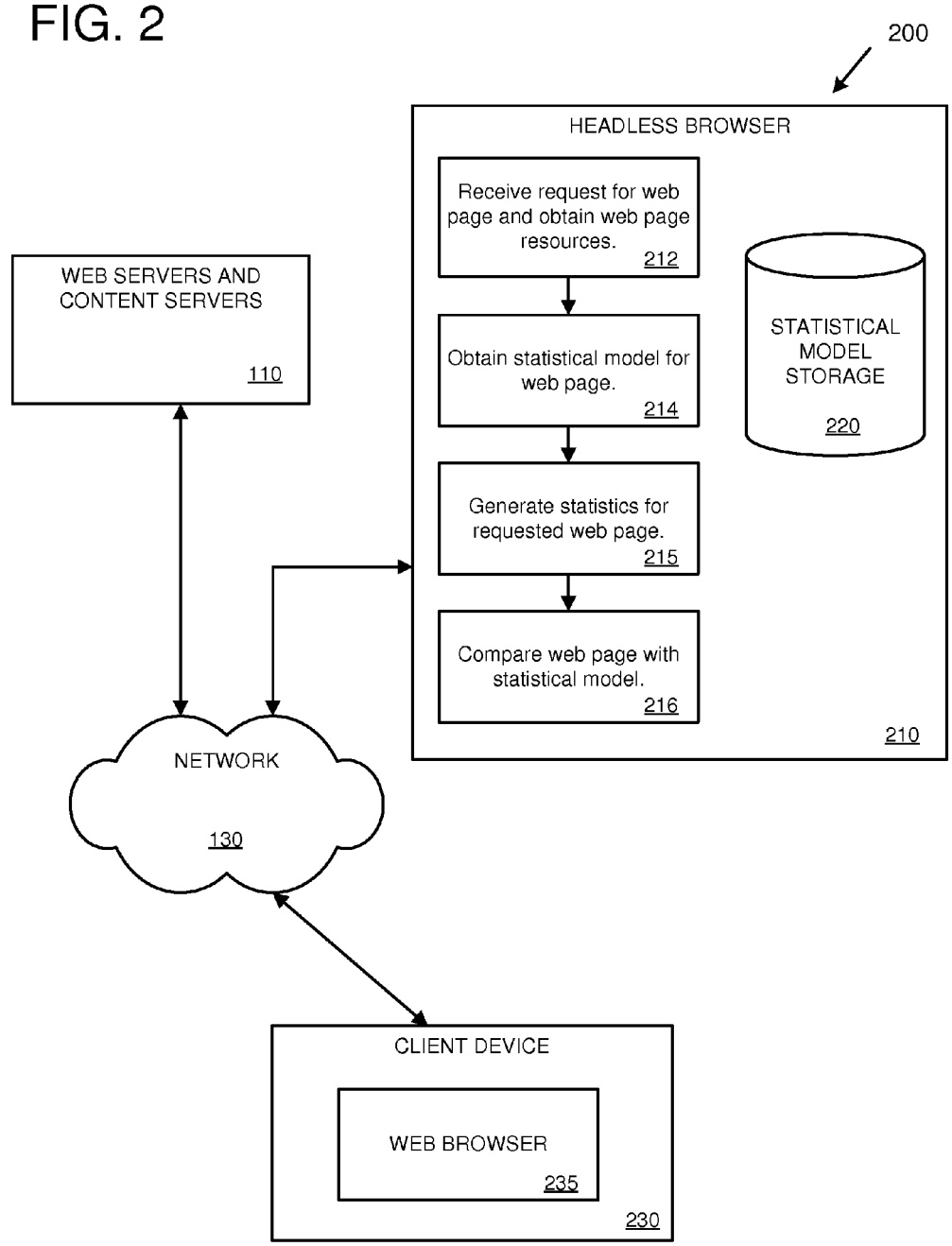
FIG. 2 is a block diagram depicting an example environment for detecting potential web page problems during web page loading in a headless browser environment.

FIG. 2 is a block diagram of an example environment 200 for detecting potential web page problems during web page loading in a headless browser environment. For example, potential problems can be detected when a web page is retrieved (e.g., from the retrieved HTML, JavaScript, images, and/or other retrieved resources related to the web page) and/or when a web page is rendered (e.g., based on DOM information, processed layers, etc.).

The example environment 200 includes a headless browser environment 210. The headless browser environment 210 can comprise various types of computing devices (e.g., server computers, databases, networking devices, etc.) that provide the headless browser environment (e.g., as a centralized service or as a distributed, or cloud-based, service). The headless browser environment 210 supports web browsing activity of client devices, such as client device 230 connected via network 130. For example, the headless browser environment 210 can receive a request for a web page from the client device 230 (e.g., via a web browser application 235 running on the client device 230). In response, the headless browser environment 210 can retrieve web page resources (e.g., HTML, JavaScript, CSS information, images, and/or other web page resources) from web servers and content servers 110. The headless browser environment 210 can provide the web page resources to the client device 230 in their original state (e.g., original HTML and related resources) and/or in a processed state. For example, the headless browser environment 210 can process the web page resources (e.g., create a DOM, create processed layers, or create bitmap images) and send the processed resources to the client device 230. The client device 230 can received the web page resources, perform local processing if needed, and display the web page within the web browser application 235.

The headless browser environment 210 can detect potential web page problems during web page loading. For example, the headless browser environment 210 can receive a request for a web page from a client device, obtain web page resources for the web page (e.g., from the web servers and content servers 110), receive HTML and related web resources, generate statistics (e.g., size statistics and/or structure statistics) and compare the statistics to a statistical model of the web page to identify potential problems (e.g., by determining whether the statistics for the retrieved web page are consistent with the statistical model).

In some implementations, the headless browser environment 210 receives a request for a web page from the client device 230 and obtains web page resources (e.g., HTML and related resources) for the web page from the web servers and content providers 110 and/or from local storage (e.g., local cache), as depicted at 212. The headless browser environment 210 obtains a statistical model that represents previous page loads of the web page from statistical model storage 220, as depicted at 214. The statistical model can represent a known good state of the web page. In some solutions, the headless browser environment 210 generates statistics as depicted at 215 (e.g., size statistics and/or structure statistics) from the obtained web page resources (e.g., from the requested web page after it has been loaded). In other solutions, the headless browser environment 210 does not generate statistics (e.g., comparison can be performed by directly matching HTML or related resources without generating statistics).

The headless browser environment 210 compares the currently received web page (based on the web page resources received at 212) with the statistical model representing the web page in order to determine whether the currently received web page is consistent with the statistical model (e.g., to identify potential problems with the currently received web page). For example, the headless browser environment 210 can compare size information (e.g., size statistics for various components of the web page) for the currently received web page (e.g., number of bytes of HTML, number of bytes of JavaScript, etc.) against corresponding size information in the statistical model (e.g., average number of bytes of HTML from a number of previous successful page loads for the web page, average number of bytes of JavaScript from a number of previous successful page loads for the web page, etc.). A potential problem with the received web page can be identified if the currently received web page is significantly different (e.g., in terms of size of components, structure of the web page, web page elements, etc.) from the statistical model. For example, a potential problem can be identified if one or more size statistics are more than one standard deviation different from the statistical model. Other statistical comparison operations can be used to compare current web page statistics with a statistical model instead of, or in addition to, standard deviation.

If the received web page does not match the statistical model (e.g., if size statistics and/or structure of the received web page deviate significantly from the statistical model, where the amount of deviation permitted can be a predetermined or user-configured range such as a percent or a standard deviation value), the headless browser environment 210 can output an indication of a potential problem with the currently received web page. For example, the headless browser environment 210 can save an indication of the potential problem to a log file, send a notification to a provider of the web page or web site, send a notification to a provider of web browser software, or notify the user of the client device 230.

In some implementations, the headless browser environment 210 generates statistics for the currently received web page and compares the generated statistics to the statistical model. For example, the headless browser environment 210 can generate size statistics and/or structure statistics from the web page resources before they have been processed (e.g., by determining size information for HTML, JavaScript, images, etc.) and/or after they have been processed (e.g., by determining structure information from the DOM, such as the div structure of the web page).

In some implementations, the client device 230 performs some of the processing operations described above with regard to the headless browser environment 210. For example, the headless browser environment 210 can provide web page resources and a statistical model for the web page to the client device 230. The client device 230 can then perform the comparison to detect potential problems with the web page (e.g., perform the operation depicted at 216). In some implementations, the client device 230 can obtain some or all of the web page resources for the web page directly from the web servers and content servers 110 and perform the comparison at the client device 230 using a statistical model obtained from the headless browser environment 210.

Figure 3:
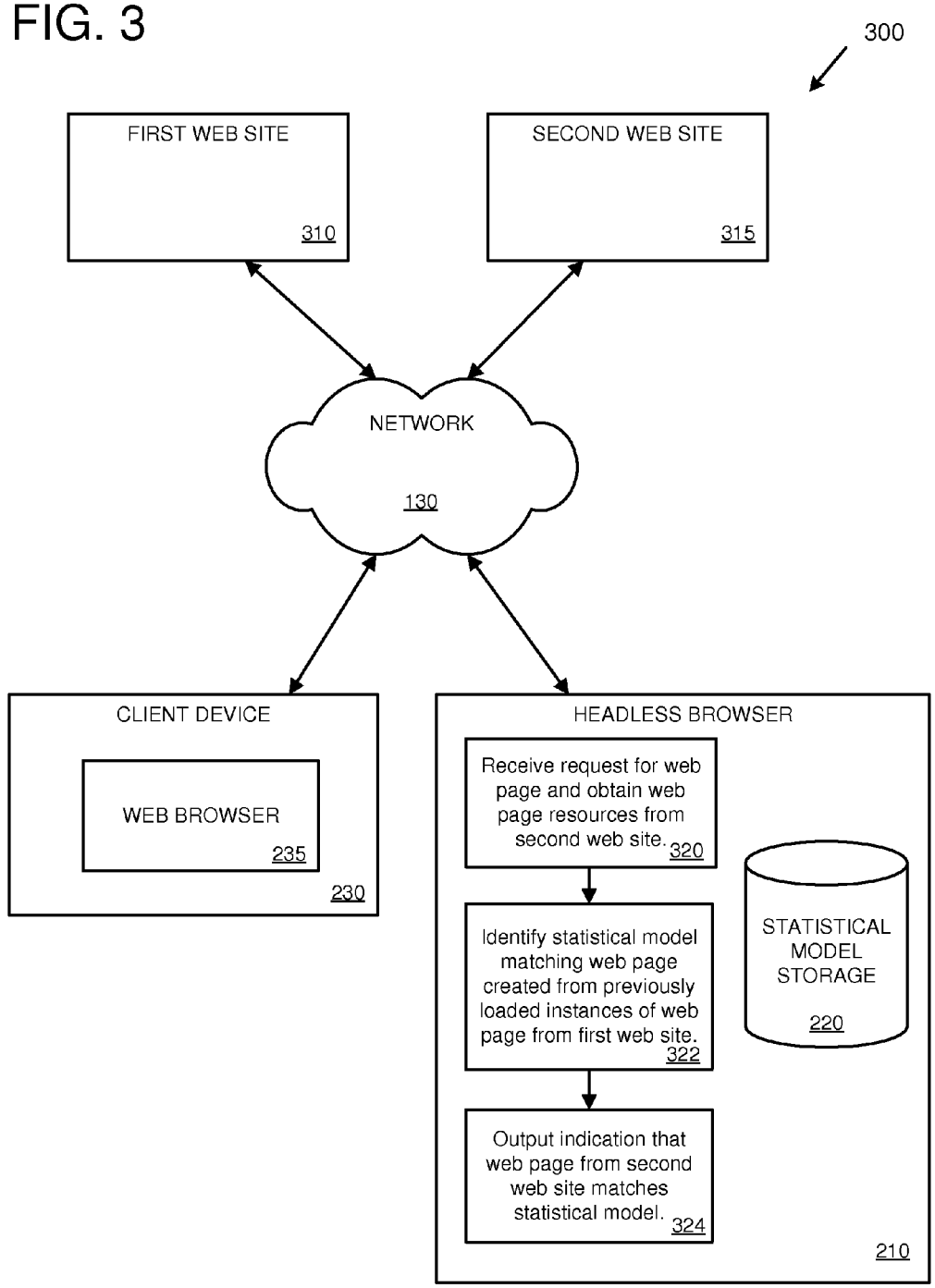
FIG. 3 is a block diagram depicting an example environment for detecting potential web page problems, including web page spoofing, during web page loading.

FIG. 3 is a block diagram of an example environment 300 for detecting potential web page problems during web page loading, including potential web page spoofing. For example, a statistical model of a web page can be created by a client device 230 and/or by a headless browser environment 210 from a number of previous page loads of the web page from a first web site 310 (e.g., where the first web site 310 is identified by a specific domain name and/or a specific IP address). In some implementations, the first web site 310 is a known legitimate source of the web page. A web page that is received (by the client device 230 and/or by the headless browser environment 210) from a second web site 315 (e.g., where the second web site 315 is identified by a specific domain name and/or a specific IP address different from the first web site 310) can be compared with statistical models of various web pages, including the statistical model created from the web page from the first web site 310. A match between the web page received from the second web site 315 and the statistical model created from the web page from the first web site 310 indicates that the web pages are the same (or likely to be the same) between the first web site 310 and the second web site 315. Such a match can indicate that the web page provided by the second web site 315 is a spoofed web page (e.g., if the second web site 315 is not a legitimate source of the web page). Various criteria can be used to determine whether the second web site 315 is spoofing the web page. For example, the domain name of the second web site 315 can be analyzed (e.g., a list of known legitimate domain names can be maintained for the web page, and a new domain name that is not in the list can indicate a spoofed web page). As another example, the IP address of the second web site 315 can be analyzed (e.g., a list of known legitimate IP addresses can be maintained for the first web site 310, and an IP address that is not in the list or that is associated with an unexpected network or geographical location can indicate a spoofed web page).

In some implementations, the headless browser environment 210 receives a request for a web page from the client device 230 and obtains web page resources for the requested web page from the second web site 315, as depicted at 320. The headless browser environment 210 identifies a statistical model that matches the web page retrieved from the second web site 315, where the statistical model is created from previously loaded instances of the web page from the first web site 310. For example, the headless browser environment 210 can compare the web page received from the second web site 315 with a number of statistical models stored in the statistical model storage 220 to identify the statistical model that matches (e.g., by comparing size statistics and/or structure statistics). The headless browser environment 210 outputs an indication that the web page received from the second web site 315 matches the statistical model created from the web page of the first web site 310. The indication can include saving a notification in a log file at the headless browser environment 210, alerting a user of the client device 230, etc.

Figure 4:
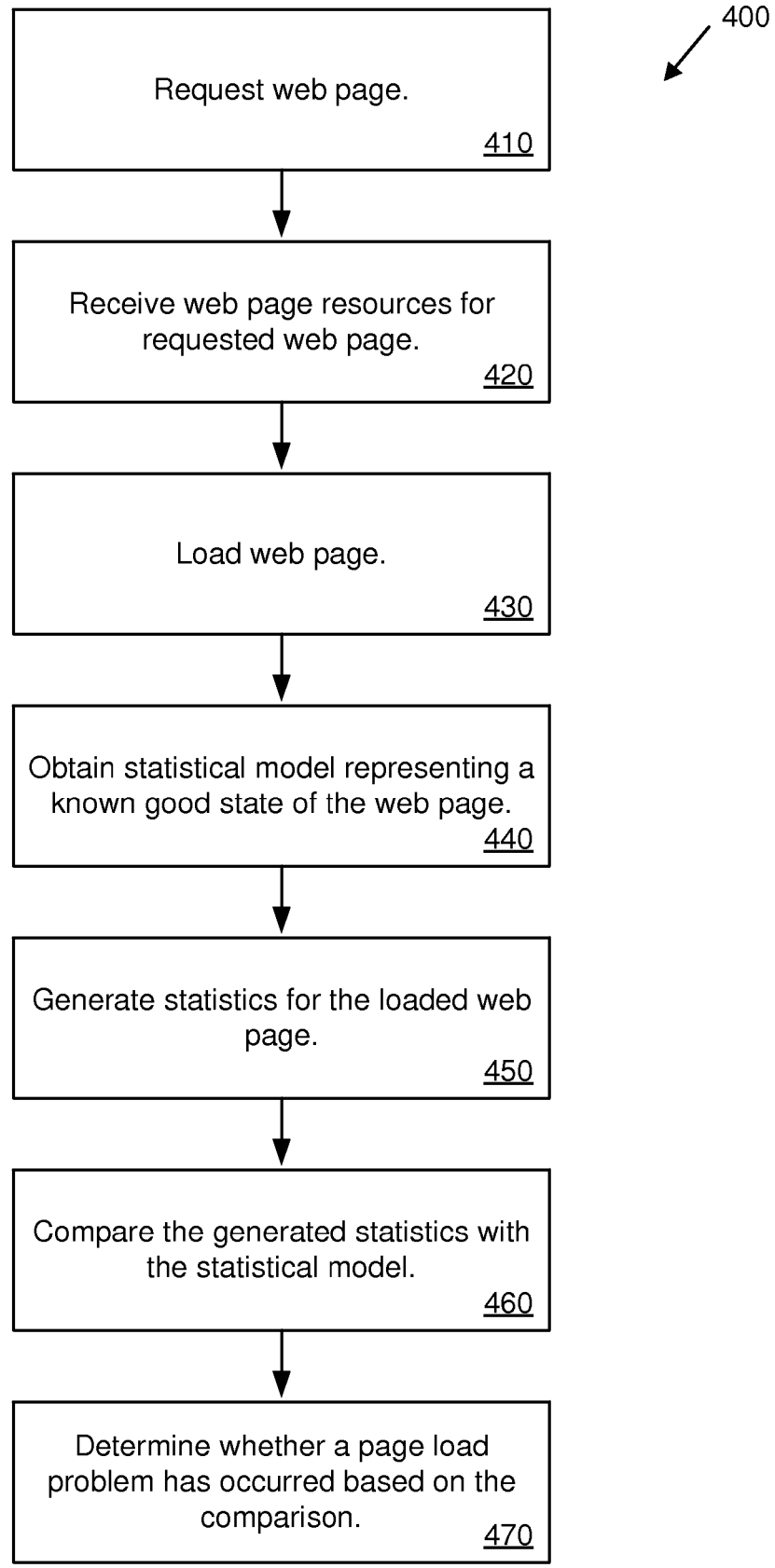
FIGS. 4, 5, and 6 are flow charts of example methods for detecting potential problems during web page loading.

FIG. 4 is a flow chart of an example method 400 for detecting potential problems during web page loading. At 410, a web page is requested. For example, the web page can be requested by a user of a computing device (e.g., by entering a URL for the web page or by selecting a link to the web page).

At 420, web page resources for the requested web page are received. The web page resources can comprise HTML and related resources (e.g., image files, CSS information, JavaScript files, video content, and/or other resources referenced by the web page). The web page resources can be received directly from web servers or content servers and/or from an intermediary system (e.g., a headless browser environment).

At 430, the web page is loaded. For example, a web browser application can receive and load the web page using the web page resources. Loading the web page can comprise loading HTML and related resources (e.g., JavaScript, images, etc.) into the web browser application, creating a DOM for the web page, creating processed layers (e.g., render layers or composited layers), creating bitmap images, or performing other processing operations.

At 440, a statistical model representing a known good state of the web page is obtained. The statistical model can be created from a number of previous page loads for the web page (e.g., previous page loads that are determined to be correct). The statistical model can represent an average or typical version of the web page. For example, a web page may typically have only a small variation in component size and structure, which can be reflected in its statistical model having a small variation in average size and layout statistics (e.g., the standard deviation may be relatively low). On the other hand, a web page may typically (e.g., as determined from a number of previous page loads) have a large variation in component size and structure, which can be reflected in its statistical model having a large variation in average size and layout statistics (e.g., the standard deviation may be relatively high).

At 450, statistics for the loaded web page are generated. For example, size statistics (e.g., HTML size, JavaScript size, CSS size, image size, etc.) and/or structure statistics can be generated.

At 460, the generated statistics for the loaded web page are compared with the statistical model. For example, size and/or structure statistics that are generated from the loaded web page can be compared to corresponding size and/or structure statistics from the statistical model (e.g., representing average or aggregate statistics from previous page loads).

At 470, a determination is made as to whether a page load problem has occurred based on results of the comparison performed at 460. If a page load problem has occurred, then an indication of the problem can be output (e.g., saved to a local or remote log file, sent to an administrator, provided to a user as an alert, etc.).

Figure 5:
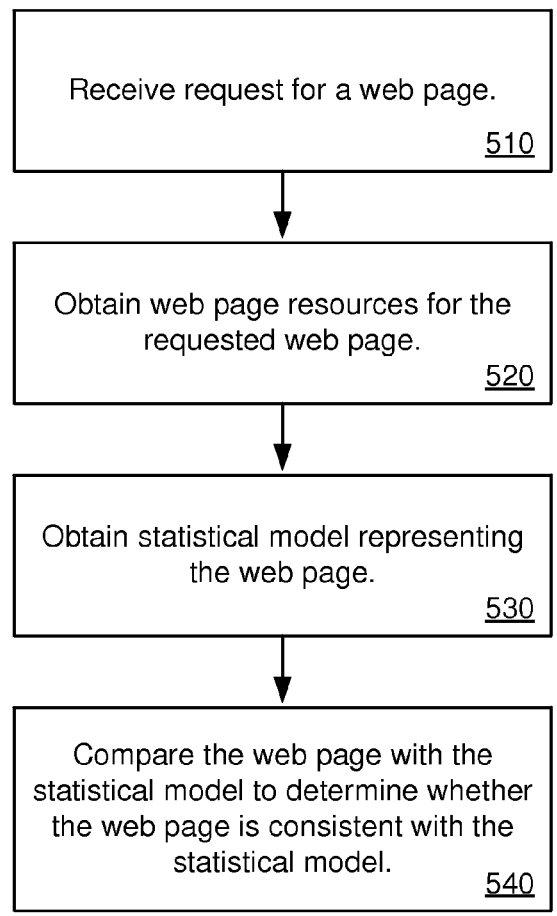

FIG. 5 is a flow chart of an example method 500 for detecting potential problems during web page loading. At 510, a request for a web page is received. For example, the web page request can be received by a web browser application (e.g., in response to a user-entered URL or selected link). The web page request can also be received by a headless browser environment (e.g., headless browser environment 210).

At 520, web page resources for the requested web page are obtained. The web page resources can comprise HTML and related resources (e.g., image files, CSS information, JavaScript files, video content, and/or other resources referenced by the web page). The web page resources can be obtained directly from web servers or content servers, from a local cache, and/or from an intermediary system (e.g., a headless browser environment).

At 530, a statistical model representing the web page is obtained. The statistical model can be created from previously loaded instances of the web page (e.g., created to reflect average statistics of the previously loaded instances, including average size statistics and average structure statistics). The statistical model can represent expected properties for a typical page load. For example, a web page may typically have only a small variation in component size and structure, which can be reflected in its statistical model having a small variation in average size and layout statistics (e.g., the standard deviation may be relatively low). On the other hand, a web page may typically (e.g., as determined from a number of previous page loads) have a large variation in component size and structure, which can be reflected in its statistical model having a large variation in average size and layout statistics (e.g., the standard deviation may be relatively high).

At 540, the requested web page is compared with the statistical model obtained at 530 to determine whether the web page is consistent with the statistical model. The comparison can include determining whether the web page is within a range of known good values for various components of the web page (e.g., size statistics and/or structure statistics as obtained from the statistical model). If the web page is consistent with the statistical model, the web page can be loaded and displayed (e.g., provided to a web browser application at a client device for display). Indications of a successful match can also be output (e.g., saved to a log file). However, if the web page is not consistent with the statistical model, then an indication of a potential page load problem can be output (e.g., saved to a local or remote log file, sent to an administrator, provided to a user as an alert, etc.).

Figure 6:
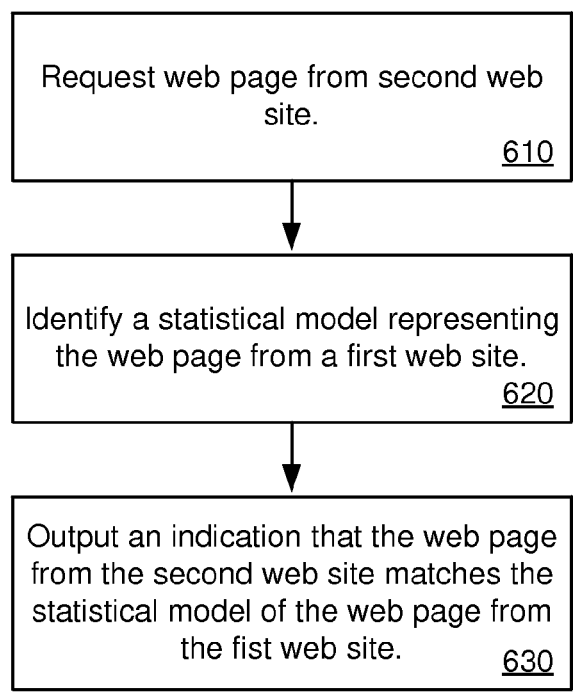

FIG. 6 is a flow chart of an example method 600 for detecting potential problems, such as web page spoofing, during web page loading. At 610, a request is made for a web page from a second web site. The second web site can be identified by a specific domain name, URL, and/or a specific IP address.

At 620, a statistical model is identified that represents the web page in relation to a first web site that is different from the second web site. For example, the statistical model can be created from previously loaded instances of the web page from the first web site. The first web site can be identified by a specific domain name, URL, and/or IP address that is different from the first web site. In some implementations, the statistical model is identified as a matching statistical model among a collection of statistical models for various web pages. Identifying the statistical model as a match can include comparing size statistics and/or structure statistics generated from the requested web page from the second web site with the statistical model.

At 630, an indication that the web page from the second web site matches the statistical model of the web page from the first web site is output. In some implementations, the indication is that the web page from the second web site may be a spoofed web page. Outputting the indication can comprise saving the indication to a local or remote log file, sending an alert to an administrator, or alerting the user.

In some implementations, other criteria are used to determine that the web page requested from the second web site (at 610) is a potentially spoofed web page. For example, the IP address of the second web site can be analyzed to determine its network location (e.g., network provider) and/or geographical location (e.g., country). A network location and/or geographical location that is not an expected source of the web page can be an indication that the web page is not from a legitimate source (e.g., that it is spoofed). For example, a list of legitimate network providers, geographical locations, and/or IP addresses (e.g., network address ranges) can be maintained in association with the statistical model and used for comparison purposes.

Figure 7:
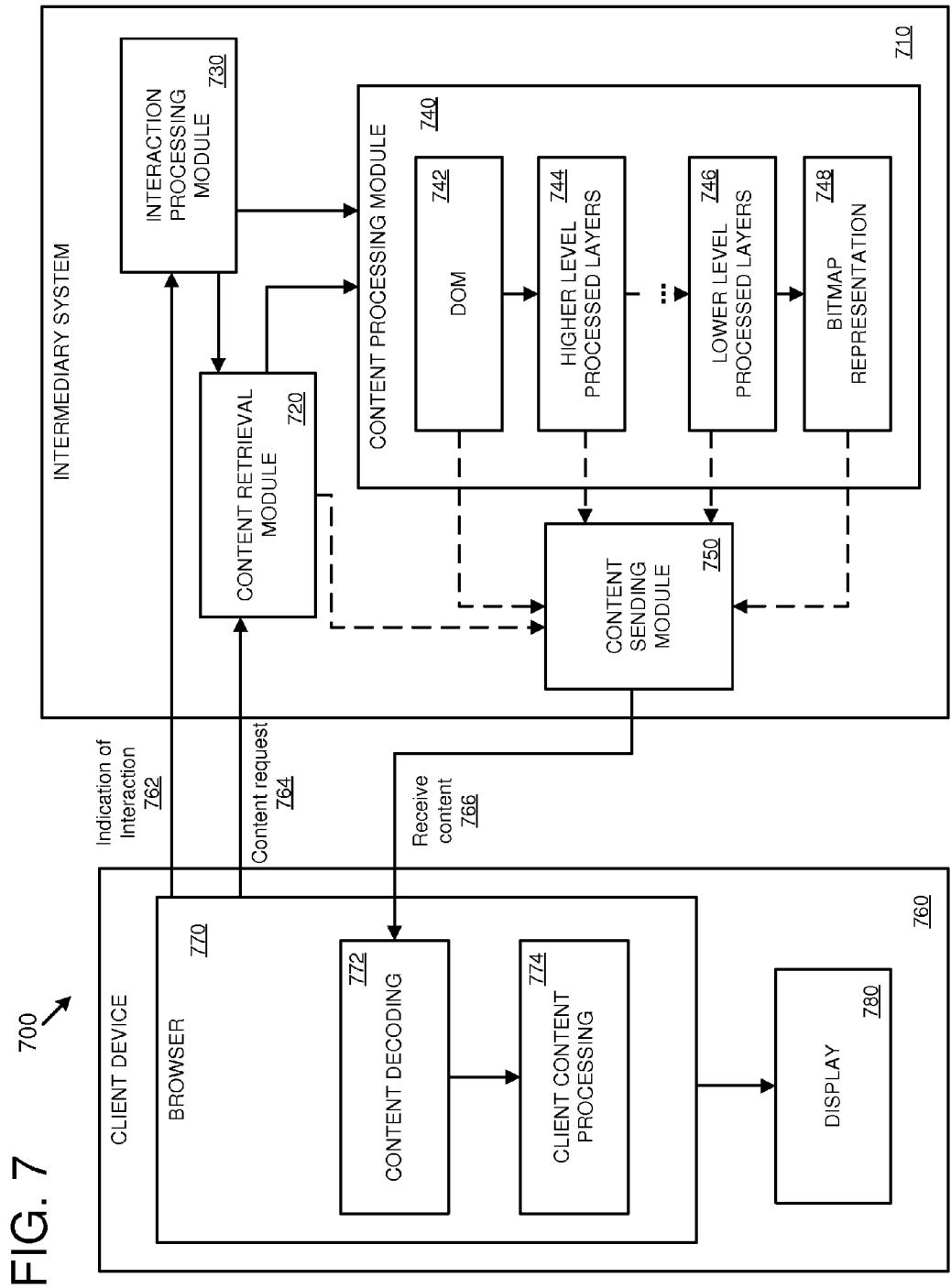
FIG. 7 is a block diagram depicting an example environment for web browsing using an intermediary system.

FIG. 7 is a block diagram depicting an example environment 700 in which content consumption activity (e.g., web browsing) is performed by a client device 760 in communication with an intermediary system 710. For example, the intermediary system 710 can be a headless browser system that performs web browsing operations independently, or in combination with, the client device 760.

The activity shown in FIG. 7 will be discussed with respect to a request for, processing of, and interaction with a content page, such as a web page. Illustratively, the content page may be any content page hosted or offered by a content source, such as a web site. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various resources including location identifiers where the resources may be obtained (e.g., local identifiers and/or external identifiers such as addresses of servers where the resources may be obtained).

As illustrated, the browser 770 of the user device 760 can send a request for content (as indicated at 764) to the content retrieval module 720 of the intermediary system 710. The request for content can be, for example, a request for a web page generated when the user selects a user-selectable option directing the browser 770 to the web page URL. The request for content may be a standardized request, such as an HTML GET request that requests a resource at a particular location. In some embodiments, the request for content may be a request for layers (e.g., for processed layers). In some embodiments, the request for content can be accompanied by data representing capabilities of client device 760, for example one or more of processing capabilities, network connection parameters, and configuration of browser 770, to name a few.

In some embodiments, when intermediary system 710 receives the request for a content page, the intermediary system 710 can assess, for the content page, whether sending the content for the page as processed layers (e.g., at one or more levels of processing) to the client device 760 will reduce a user-perceived page load time relative to at least one alternative rendering technique. In some cases, the intermediary system 710 can determine whether a layer transfer rendering technique, in which processed layers are sent, is preferable for a given page load based on a number of factors, for example the speed, bandwidth, and type of network connection of client device 760 as well as characteristics of the content site. For example, intermediary system 710 can determine or predict whether the layer transfer rendering technique will reduce a page load time and/or bandwidth consumption compared to fully rendering the content page on the browser 770 (e.g., sending original HTML and associated web resources and having the browser 770 perform all of the rendering pipeline operations) or fully rendering the content page on the intermediary system 710 (e.g., performing all of the rendering pipeline operations and sending a bitmap representation to the client device 760).

The content retrieval module 720 can retrieve the content of the content page, for example HTML and associated resources, from content sources (e.g., web servers or content servers) and/or from local storage (e.g., cache). In some implementations, the network connection between the content retrieval module 720 and the content sources may be faster than the network connection between the client device 760 and the content sources, thereby reducing latency in rendering the content page for the user. The content source may be the origin content server, a CDN server, a proxy server, or some other source.

The content processing module 740 (e.g., implementing all or part of a rendering pipeline) can receive content (e.g., web page content) from the content retrieval module 720. The content processing module 740 can construct a Document Object Model (DOM) from of the received content, as indicated at 742. For example, the DOM can be constructed by converting HTML elements and any embedded resources into DOM nodes based on a DOM definition or specification. Creating the DOM can also involve parsing any available style data, such as style data obtained from a referenced CSS file or style data included in the HTML file.

Based on the DOM, different levels of processed layers can be generated, which can include higher level processed layers 744, lower level processed layers 746 and any processed layers in-between. While two levels of processed layers are depicted (744 and 746), different implementations can have more or fewer levels of processed layers. Different layers of a content page can encompass different two-dimensional areas of the content page (for example, cover different ranges of coordinates without overlapping). In some cases, one layer may partially or completely overlap another layer (for example, a background layer may be partially overlapped by any number of other layers, each of which may partially or completely overlap other layers, etc.). The content processing module 740 can also create a bitmap representation of the content (e.g., the web page) using the processed layers, as depicted at 748. Depending on the specific configuration being used, the content processing module 740 can create information for one or more of the levels of processing (e.g., 742, 744, 746, and/or 748). For example, the content processing module 740 may process the content to create a DOM (as depicted at 742) and a higher level processed layer (as depicted at 744) without any additional processing (e.g., without proceeding to lower level processed layers or bitmaps, as depicted at 746 and 748).

The intermediary system 710 supports sending content to the client device 760 at different levels of processing. For example, the content sending module 750 can receive raw content (e.g., original HTML content and associated resources) form the content retrieval module 720. The content sending module 750 can receive DOM information from the content processing module 740. The content sending module 750 can receive different levels of processed layers from the content processing module 740. The content sending module 750 can receive bitmap images from the content processing module 740. These different sources of content are indicated by the dashed lines within the intermediary system 710. Depending on the specific configuration being used, the content sending module 750 may receive content from one or more levels of processing (e.g., the content sending module 750 may only receive lower level processed layers for sending to the client device 760).

The content sending module 750 can encode the received content for sending to the client device 760. For example, the content sending module 750 can encode layers using a variety of layer encoding techniques and can examine the content of an individual layer to determine which encoding technique to use (e.g., to minimize bandwidth or page load time, for compatibility with a particular client device, etc.).

When the client device 760 receives the content from the content sending module 750 (as indicated at 766), the browser 770 decodes the content, as indicated at 772. Decoding the content can involve performing one or more decoding techniques corresponding to the encoding techniques used to encode the content.

The browser 770 can perform client content processing, as depicted at 774. For example, the browser 770 can perform processing operations similar to, or the same as, those performed by the content processing module 740. The type of processing performed by the browser 770 can depend on the level of processing performed by the intermediary system 710. For example, if the content processing module 740 created a DOM and then a higher level processed layer (e.g., a render layer tree) and sent the higher level processed layer to the client device 760, then the browser 770 could complete the processing by creating lower level processed layers (e.g., a graphics layer tree and a composited layer tree) and bitmaps for display, as depicted at 780 (e.g., in cooperation with a GPU of the client device 760, not depicted).

In some embodiments, the browser 770 performs content processing, as depicted at 774, to create decoded layers that can be provided to a layer compositor (not depicted) for generating instructions for display to display (as depicted at 780) a visual representation of the content page based on the layers. For example, a layer tree can be constructed so that the layers will be decoded and provided to the layer compositor in an order in which the layers should be rendered. For example, the layer compositor can assemble the decoded layers in the proper positioning and in the proper order (e.g., with a background layer behind other layers, foreground layers covering background layers with overlapping coordinates, and with an interactivity layer in front of the layers). The layer compositor can use the assembled layers to generate instructions to configure to display a visual representation of the content page.

The browser 760 can also detect user interaction with elements of the displayed content (e.g., user-selectable user-interface elements such as buttons and menus, scrolling, zooming, etc.) and send indications of user interaction to the interaction processing module 730, as indicated at 762. The browser 770 can also be configured to perform local rendering updates in some embodiments. As discussed above, a layer can be generated corresponding to a scrollable portion of the content page. Accordingly, the browser 770 can use the scrollable layer data to locally handle scrolling through the layer by updating the portion of the scrollable layer content that is displayed in the viewport, or boundary, of the scrollable layer. The browser 770 can also detect changing graphical content, for example in a GIF or video, and send a request for updated content to the intermediary system 710 if needed. In some embodiments the browser 770 may have received a URL corresponding to video content from the intermediary system 710, and accordingly may be able to handle the update to the portion of the content page including the video without sending a request to the intermediary system 710.

For any interactions that are not able to be handled locally by the browser 770 using the received content, the browser 770 can send the indications of user interaction, as depicted at 762, to the interaction processing module 730. The interaction processing module 730 can determine whether any updates to the visual representation of the content page are necessitated by the user interaction with the elements of the content. For example, the interaction processing module 730 can communicate with the content retrieval module 720 to obtain new or update content. The interaction processing module 730 can also communicate with the content processing module 740 to perform processing of content (e.g., an update to the DOM, an update to one or more processing layers, etc.) for sending back to the client device 760 in response to the interaction.

In some implementations, example environment 700 supports detection of potential problems with web pages (e.g., during web page loading, which can include web page retrieval, rendering, and/or display). For example, the intermediary system 710 and/or the client device 760 compare a retrieved web page with a statistical model of the web page (e.g., created from previous page loads of the web page) to determine if the retrieved web page matches (e.g., is consistent with) the statistical model. The retrieved web page can be compared with the statistical model using a variety of statistics, including size statistics and structure statistics.

Figure 8:
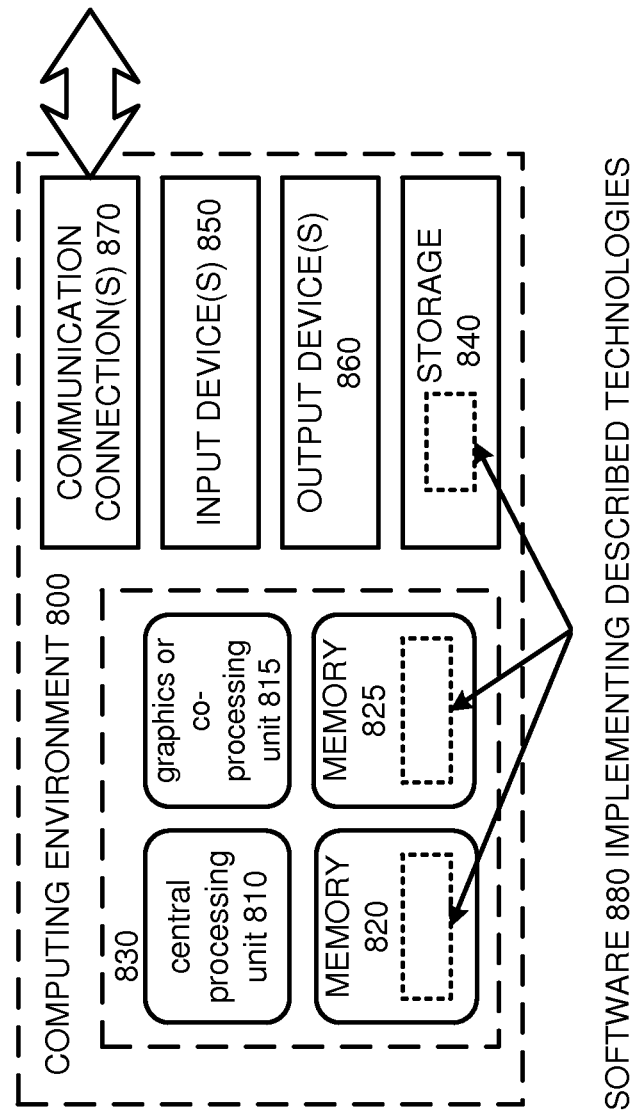
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a touch display or touchpad, a keyboard, a mouse, a pen, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a client computing device, for detecting problems during web page loading, the method comprising:
   requesting a web page;
   in response to the request, receiving web page resources for the web page, wherein the web page resources comprise HyperText Markup Language (HTML) and related resources;
   loading the web page;
   obtaining a statistical model created from previous web page loads of the web page, wherein the statistical model represents a known good state of the web page, and wherein the statistical model for the web page comprises a fingerprint representing structure information of the web page generated from a plurality of successful previous page loads for the web page, the structure information comprising at least one of division (div) elements or document object model (DOM) elements;
   generating statistics for the loaded web page; and
   comparing the generated statistics for the loaded web page with the obtained statistical model for the web page including comparing a fingerprint representing structure information of the loaded web page to the fingerprint from the statistical model; and
   determining whether a page load problem has occurred based on results of the comparison.

2. The method of claim 1 further comprising:
   when the page load problem has occurred, outputting an indication of the page load problem.

3. The method of claim 1 wherein determining whether a page load problem has occurred comprises:
   obtaining a standard deviation value associated with the statistical model; and
   determining that a page load problem has occurred when a difference between the generated statistics for the loaded web page and the obtained statistical model for the web page exceeds the standard deviation value.

4. The method of claim 1 wherein the statistical model for the web page comprises average byte counts for a plurality of web page resources generated from a plurality of successful previous page loads for the web page.

5. The method of claim 4 wherein the average byte counts comprise:
   number of bytes of HTML; and
   number of bytes of JavaScript.

6. The method of claim 1 wherein the structure information comprises div elements, wherein the fingerprint for the loaded web page and the fingerprint from the statistical model comprise a count of div elements, and wherein the comparing performs a comparison of the counts of div elements.

7. The method of claim 6 wherein count of div elements is a count of unique div elements.

8. The method of claim 1 wherein the structure information comprises div elements, wherein the fingerprint for the loaded web page and the fingerprint from the statistical model comprise identification of div elements with specific attribute identifiers, and wherein the comparing performs a comparison between div elements with the specific attribute identifiers.

9. A computing device comprising:
   one or more processing units; and
   one or more network interfaces;
   the computing device configured to perform operations for detecting problems during web page loading, the operations comprising:
      receiving a request for a web page;
      in response to the request, obtaining web page resources for the web page, wherein the web page resources comprise HyperText Markup Language (HTML) and related resources;
      obtaining a statistical model for the web page, wherein the statistical model represents previously loaded instances of the web page, and wherein the statistical model for the web page comprises a fingerprint representing structure information of the web page generated from a plurality of successful previous page loads for the web page, the structure information comprising at least one of division (div) elements or document object model (DOM) elements; and
      comparing the web page with the statistical model to determine whether the web page is consistent with the statistical model, comprising:
         creating a fingerprint representing structure information of the requested web page; and
         comparing the fingerprint representing the structure of the requested web page to the fingerprint from the statistical model.

10. The computing device of claim 9, the operations further comprising
    outputting a notification when a difference between the web page and the statistical model is over a threshold value.

11. The computing device of claim 9, the operations further comprising
    outputting a notification indicating a possible problem with the web page when a difference between the web page and the statistical model is greater than one standard deviation.

12. The computing device of claim 9, wherein comparing the web page with the statistical model comprises:
    collecting statistics representing a number of bytes for one or more components of the web page; and
    comparing the collected statistics with the statistical model.

13. The computing device of claim 9, wherein comparing the web page with the statistical model comprises:
- collecting statistics representing a number of bytes for a plurality of components of the web page, comprising:
  - a number of bytes representing HTML of the web page;
  - a number of bytes representing JavaScript of the web page;
  - a number of bytes representing Cascading Style Sheet (CSS) information of the web page; and
  - a number of bytes representing one or more images of the web page; and
- comparing the collected statistics with corresponding average statistics for the plurality of components from the statistical model.

14. The computing device of claim 9, wherein comparing the web page with the statistical model to determine whether the web page is consistent with the statistical model comprises:
- creating the fingerprint representing structure information of the requested web page, the structure elements comprising division (div) elements.

15. The computing device of claim 9, wherein comparing the web page with the statistical model to determine whether the web page is consistent with the statistical model comprises:
- creating a document object model (DOM) of the requested web page;
- creating the fingerprint of the requested web page based, at least in part, on one or more DOM elements.

16. A computer-readable storage medium storing computer-executable instructions for causing a computing device to perform operations for detecting problems during web page loading, the operations comprising:
- requesting a web page from a second web site;
- in response to the request, receiving web page resources for the web page, wherein the web page resources comprise HyperText Markup Language (HTML) and related resources;
- identifying a statistical model for the web page, wherein the statistical model represents previously loaded instances of the web page from a first web site different from the second web site, and wherein the statistical model is identified based on a match between the web page from the second web site and the statistical model, and wherein the statistical model for the web page comprises a fingerprint representing structure information of the web page generated from the previously loaded instances of the web page from the first web site, the structure information comprising at least one of division (div) elements or document object model (DOM) elements, wherein identifying the statistical model comprises:
  - comparing structure information for the web page from the second web site with the fingerprint from the statistical model; and
- outputting an indication that the web page from the second web site matches the statistical model of the web page from the first web site.

17. The computer-readable storage medium of claim of claim 16, the operations further comprising:
- generating statistics for the web page from the second web site; and
- determining that the statistics for the web page from the second web site match the statistical model, comprising:
  - determining that one or more of the generated statistics are substantially the same as one or more corresponding statistics of the statistical model.

18. The computer-readable storage medium of claim of claim 17 wherein the one or more generated statistics comprise one or more of:
- a number of bytes representing HTML of the web page from the second web site; and
- a number of bytes representing JavaScript of the web page from the second web site.

19. The computer-readable storage medium of claim of claim 16 wherein the first web site and the second web site have at least one of:
- different domain names; and
- different Internet Protocol (IP) addresses.

20. The computer-readable storage medium of claim of claim 16 wherein outputting an indication that the web page from the second web site matches the statistical model of the web page from the first web site comprises at least one of:
- alerting a user that the web page from the second web site may be spoofed; and
- saving the indication at a server environment.

* * * * *